United States Patent
Jeyaseelan et al.

(10) Patent No.: US 8,601,296 B2
(45) Date of Patent: Dec. 3, 2013

(54) DOWNSTREAM DEVICE SERVICE LATENCY REPORTING FOR POWER MANAGEMENT

(75) Inventors: Jaya L. Jeyaseelan, Cupertino, CA (US); Jim Walsh, Santa Clara, CA (US); Robert E. Gough, Cornelius, OR (US); Barnes Cooper, Tigard, OR (US); Neil W. Songer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 426 days.

(21) Appl. No.: 12/346,853

(22) Filed: Dec. 31, 2008

(65) Prior Publication Data

US 2010/0169684 A1     Jul. 1, 2010

(51) Int. Cl.
| | |
|---|---|
| *G06F 1/26* | (2006.01) |
| *G06F 1/00* | (2006.01) |
| *G06F 3/00* | (2006.01) |
| *G06F 13/00* | (2006.01) |
| *G06F 13/42* | (2006.01) |
| *H04L 12/26* | (2006.01) |

(52) U.S. Cl.
USPC ........... 713/320; 713/323; 713/324; 370/229; 710/18; 710/36; 710/104; 710/105

(58) Field of Classification Search
USPC ............. 713/320, 323, 324; 370/229; 710/18, 710/36, 104, 105
See application file for complete search history.

(56) References Cited

U.S. PATENT DOCUMENTS

| | | |
|---|---|---|
| 7,188,263 B1 | 3/2007 | Rubinstein et al. |
| 7,325,151 B2 | 1/2008 | Maruichi et al. |
| 7,372,814 B1 * | 5/2008 | Chiruvolu et al. ............ 370/235 |
| 7,406,365 B2 | 7/2008 | Pratt et al. |
| 7,430,673 B2 | 9/2008 | Kardach et al. |
| 7,447,824 B2 * | 11/2008 | Jabori et al. .................. 710/307 |
| 7,480,753 B2 | 1/2009 | Bohm et al. |
| 7,493,228 B2 | 2/2009 | Kwa et al. |
| 7,716,506 B1 * | 5/2010 | Surgutchik et al. ........... 713/321 |
| 7,721,031 B2 * | 5/2010 | Tseng et al. .................. 710/105 |
| 7,734,853 B2 * | 6/2010 | Croxford ...................... 710/110 |

(Continued)

FOREIGN PATENT DOCUMENTS

| | | |
|---|---|---|
| CN | 1592879 A | 3/2005 |
| JP | 2001-318742 A | 11/2001 |

(Continued)

OTHER PUBLICATIONS

English Translation of Korean Intellectual Property Office, Notice of Preliminary Rejection for corresponding Patent Application No. 2009-0130939, mailed Mar. 18, 2011, 3 pages.

(Continued)

*Primary Examiner* — Stefan Stoynov
(74) *Attorney, Agent, or Firm* — Matthew C. Fagan

(57) ABSTRACT

For one disclosed embodiment, a transition from a first state to a second, different state for at least a portion of a downstream device may be identified. The first and second states may correspond to different levels relating to activity for at least a portion of the downstream device. Data corresponding to a service latency may be transmitted to an upstream device in response to the identified transition for one or more upstream devices to manage power based at least in part on the service latency. Other embodiments are also disclosed.

24 Claims, 11 Drawing Sheets

(56) References Cited

U.S. PATENT DOCUMENTS

| | | | |
|---|---|---|---|
| 7,752,473 B1 | 7/2010 | Kwa et al. |
| 7,864,720 B2 | 1/2011 | Jeyaseelan |
| 7,979,234 B2 | 7/2011 | Kwa et al. |
| 7,984,314 B2 | 7/2011 | Cooper et al. |
| 8,176,341 B2 | 5/2012 | Jeyaseelan et al. |
| 8,255,713 B2 | 8/2012 | Jeyaseelan et al. |
| 8,332,675 B2 | 12/2012 | Kwa et al. |
| 8,341,445 B2 | 12/2012 | Cooper et al. |
| 8,427,993 B2 | 4/2013 | Jeyaseelan |
| 2003/0210658 A1 | 11/2003 | Hernandez et al. |
| 2005/0210312 A1 | 9/2005 | Maruichi et al. |
| 2006/0294179 A1 | 12/2006 | Kwa et al. |
| 2007/0005995 A1 | 1/2007 | Kardach et al. |
| 2008/0288798 A1 | 11/2008 | Cooper et al. |
| 2008/0298289 A1 | 12/2008 | Jeyaseelan |
| 2009/0172434 A1 | 7/2009 | Kwa et al. |
| 2009/0249103 A1 | 10/2009 | Jeyaseelan et al. |
| 2009/0327774 A1 | 12/2009 | Jeyaseelan et al. |
| 2010/0169685 A1 | 7/2010 | Gough et al. |
| 2011/0078473 A1 | 3/2011 | Kwa et al. |
| 2011/0276816 A1 | 11/2011 | Cooper et al. |
| 2011/0302626 A1 | 12/2011 | Kwa et al. |
| 2012/0198248 A1 | 8/2012 | Jeyaseelan et al. |
| 2012/0324265 A1 | 12/2012 | Jeyaseelan et al. |
| 2013/0132755 A1 | 5/2013 | Cooper et al. |

FOREIGN PATENT DOCUMENTS

| | | | |
|---|---|---|---|
| JP | 2002-082743 A | 3/2002 |
| JP | 2005-234826 A | 9/2005 |
| JP | 2010-113641 A | 5/2010 |
| KR | 10-2003-0093261 A | 12/2003 |
| KR | 10-2007-0105855 A | 10/2007 |
| TW | 200745835 A | 12/2007 |
| WO | 02/076081 A2 | 9/2002 |
| WO | 03/027817 A2 | 4/2003 |
| WO | 2007/098411 A2 | 8/2007 |
| WO | 2008/012483 A1 | 1/2008 |

OTHER PUBLICATIONS

State Intellectual Property Office, P.R. China, Office Action for corresponding Patent Application No. 200911000103.3, mailed Jul. 14, 2011, 5 pages.
English Translation of State Intellectual Property Office, P.R. China, Office Action for corresponding Patent Application No. 200911000103.3, mailed Jul. 14, 2011, 8 pages.
Japan Patent Office, Notice of Reasons for Rejection for corresponding Patent Application No. 2009-293551, mailed Nov. 1, 2011, 1 page.
English Translation of Japan Patent Office, Notice of Reasons for Rejection for corresponding Patent Application No. 2009-293551, mailed Nov. 1, 2011, 1 page.
German Patent and Trade Mark Office Decision for corresponding Patent Application No. 10 2009 060 269.0, mailed Feb. 17, 2012, 4 pages.
English Translation of German Patent and Trade Mark Office Decision for corresponding Patent Application No. 10 2009 060 269.0, mailed Feb. 17, 2012, 2 pages.
Japan Patent Office, Notice of Reasons for Rejection for corresponding Patent Application No. 2009-293551, delivered Dec. 11, 2012, 2 pages.
English Translation of Japan Patent Office, Notice of Reasons for Rejection for corresponding Patent Application No. 2009-293551, delivered Dec. 11, 2012, 2 pages.
Patent Abstracts of Japan, Publication No. 2002-082743 which was published Mar. 22, 2002, 1 page.
Computer translation of Japanese Publication No. 2002-082743 which was published Mar. 22, 2002, 7 pages.
Patent Abstracts of Japan, Publication No. 2005-234826 which was published Sep. 2, 2005, 1 page.
U.S Appl. No. 13/725,880, filed Dec. 21, 2012.
Ajanovic, Jasmin, PCI Express* (PCIe*) 3.0 Accelerator Features, Intel Corporation, White Paper, 10 pages (2008).
Cooper, Barnes, et al., Designing Power-Friendly Devices, Microsoft Windows Hardware Engineering Conference (WinHEC) 2007, Intel Corporation, 27 pages (May 8, 2007).
Jeyaseelan, Jaya, Energy Efficient Platforms—New Power Management Extensions, Intel Developer Forum, 34 pages (2008).
Intel Corporation, Designing Power-Friendly Devices, White Paper, 18 pages (2007).
PCI-SIG, PCIe Enhancements for Platform PM Improvement—Latency Tolerance Reporting, 6 pages (Dec. 12, 2007).
PCI-SIG, PCIe Enhancements for Platform PM Improvement—Optimized Buffer Flush/Fill, 7 pages (Dec. 12, 2007).
Latency Tolerance Reporting, PCI-SIG Draft Engineering Change Request, 6 pages (Jan. 22, 2008).
Latency Tolerance Reporting, PCI-SIG Draft Engineering Change Request, 6 pages (Jan. 22, 2008, updated Feb. 5, 2008).
Latency Tolerance Reporting, PCI-SIG Draft Engineering Change Request, 6 pages (Jan. 22, 2008, updated Feb. 8, 2008).
Latency Tolerance Requirement Reporting, PCI-SIG Draft Engineering Change Request, 13 pages (Jan. 22, 2008, updated May 16, 2008).
Latency Tolerance Requirement Reporting, PIC-SIG Draft Engineering Change Request, 13 pages (Jan. 22, 2008, updated Jun. 18, 2008).
Latency Tolerance Requirement Reporting, PCI-SIG Draft Engineering Change Request, 13 pages (Jan. 22, 2008, updated Jun. 19, 2008).
Latency Tolerance Reporting, PCI-SIG Draft Engineering Change Notice, 11 pages (Jan. 22, 2008, updated Aug. 9, 2008).
Latency Tolerance Reporting, PCI-SIG Engineering Change Notice, 11 pages (Jan. 22, 2008, updated Aug. 14, 2008).
Latency Tolerance & B/W Requirement Reporting, PCI-SIG Draft Engineering Change Request, 8 pages (Jan. 22, 2008, updated Feb. 19, 2008).
Opportunistic Buffer Flush/Fill, PCI-SIG Draft Engineering Change Request, 9 pages (Feb. 8, 2008, updated Feb. 19, 2008).
PCI-SIG, PCI Express Base Specification, Revision 1.0, 422 pages (Jul. 22, 2002).
PCI-SIG, PCI Express Base Specification, Revision 2.0, 608 pages (Dec. 20, 2006).
Universal Serial Bus Specification, Revision 2.0, 650 pages (Apr. 27, 2000).
USB 2.0 Link Power Management Addendum, Engineering Change Notice, 29 pages (Jul. 16, 2007).
Universal Serial Bus 3.0 Specification, Revision 1.0, 482 pages (Nov. 12, 2008).
Japan Patent Office, Decision for Grant for corresponding Patent Application No. 2009-293551, delivered Aug. 6, 2013, 1 page.
Patent Abstracts of Japan, Publication No. 2001-318742 which was published Nov. 16, 2001, 1 page.
Computer translation of Japanese Publication No. 2001-318742 which was published Nov. 16, 2001, 13 pages.
Patent Abstracts of Japan, Publication No. 2010-113641 which was published May 20, 2010, 1 page.
Computer translation of Japanese Publication No. 2010-113641 which was published May 20, 2010, 19 pages.
Taiwan Intellectual Property Office, Office Action and Search Report for corresponding Patent Application No. 098144512, dated Jul. 3, 2013, 8 pages.
English Translation of Taiwan Intellectual Property Office, Office Action and Search Report for corresponding Patent Application No. 098144512, dated Jul. 3, 2013, 6 pages.

* cited by examiner

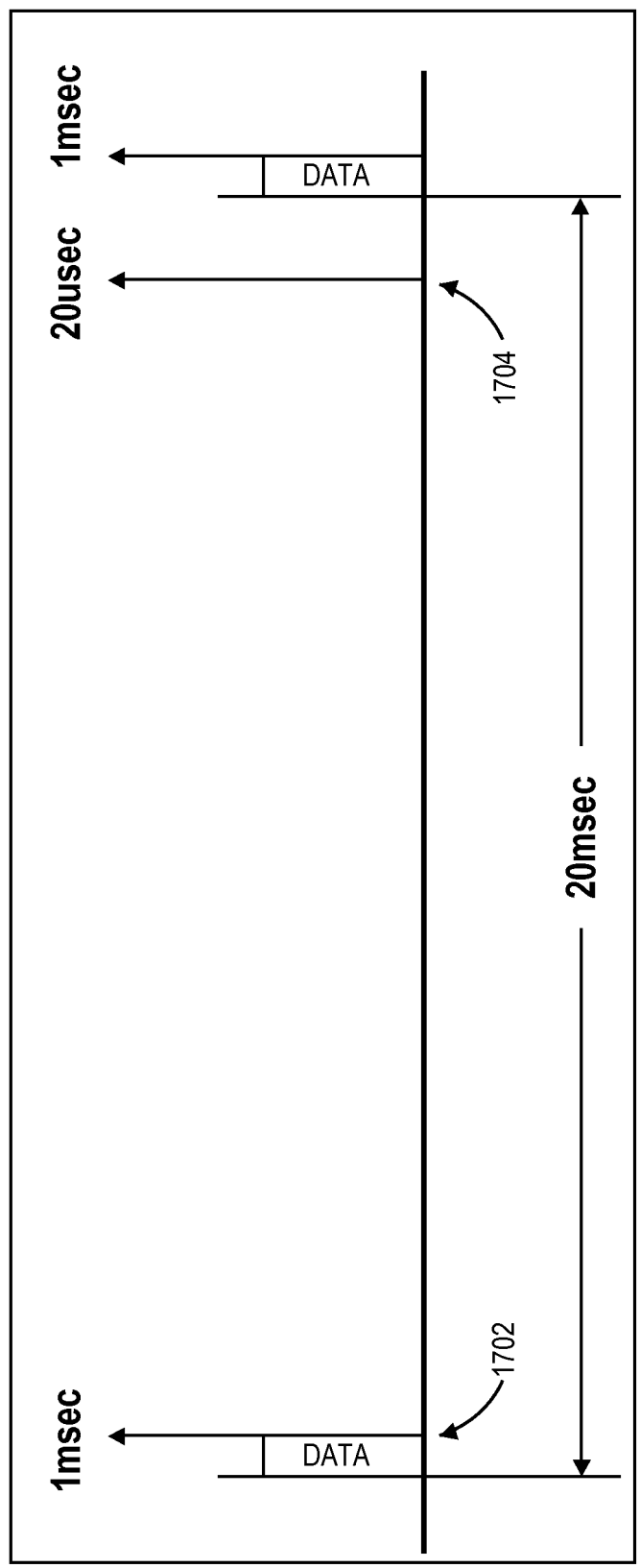

DOWNSTREAM DEVICE SERVICE LATENCY REPORTING FOR POWER MANAGEMENT

FIELD

Embodiments described herein generally relate to power management.

BACKGROUND

Power management is used in many devices and systems to improve power efficiency, helping to reduce power consumption and/or heat dissipation. For battery-powered mobile devices and systems, power management can help extend operation.

Some platform-level power management has been based on some heuristics collected on the platform and some guidance given by an operating system. Processor utilization can be used as a rough estimate of platform activity. When there is heavy input/output (I/O) activity and light processor utilization, however, the platform will be put into lower power states, impacting I/O performance. Indeed, as a platform goes into deeper power states, its response latency to break events like direct memory access (DMA) accesses and interrupts increases. Although many I/O devices are designed to tolerate some fixed minimum response latency from the platform, this can effectively limit the depth of power states which the platform may enter. The platform would compromise functionality and/or performance if the platform entered a deeper power state that increased its response latency beyond the fixed minimum an I/O device could tolerate.

BRIEF DESCRIPTION OF THE DRAWINGS

Embodiments are illustrated by way of example and not limitation in the figures of the accompanying drawings, in which like references indicate similar elements and in which:

FIG. 17 illustrates, for one embodiment, an example diagram for a downstream device to report service latency to an upstream device in accordance with the sixth technique.

The figures of the drawings are not necessarily drawn to scale.

DETAILED DESCRIPTION

The following detailed description sets forth example embodiments of apparatuses, methods, and systems relating to downstream device service latency reporting for power management. Features, such as structure(s), function(s), and/or characteristic(s) for example, are described with reference to one embodiment as a matter of convenience; various embodiments may be implemented with any suitable one or more described features.

Figure 1:
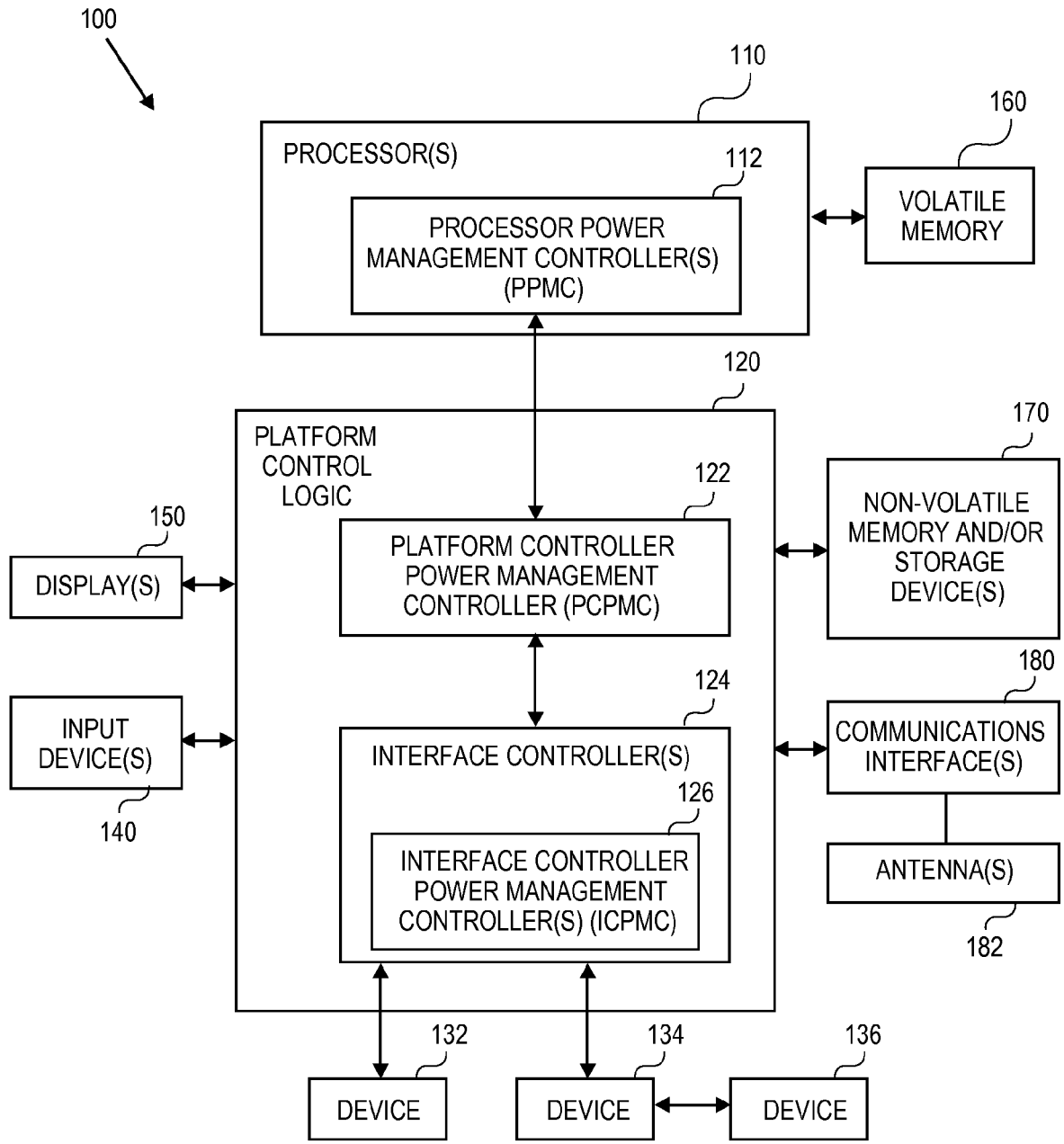
FIG. 1 illustrates, for one embodiment, a block diagram of an example system to perform power management based at least in part on service latency reporting from one or more downstream devices.

FIG. 1 illustrates an example system 100 comprising one or more processors 110 and platform control logic 120 coupled to processor(s) 110. Processor(s) 110 for one embodiment may have one or more processor power management controllers (PPMCs) 112 to help improve power efficiency for processor(s) 110. Platform control logic 120 for one embodiment may have a platform controller power management controller (PCPMC) 122 to help improve power efficiency for system 100. PCPMC 122 for one embodiment may, for example, manage one or more components of system 100 to enter into one of a plurality of lower power or sleep states when the component is less active or idle.

PCPMC 122 for one embodiment may help coordinate power management for components of system 100 to help improve power efficiency. PCPMC 122 for one embodiment may, for example, coordinate with one or more PPMCs 112 for such PPMC(s) 112 and PCPMC 122 to better identify the depth of lower power states which one or more components may enter yet still be responsive to one or more other components with reduced concern for lost functionality and/or performance.

PCPMC 122 for one embodiment may receive from one or more downstream devices, such as device 132 for example, data corresponding to a service latency for that device. PCPMC 122 for one embodiment may manage power based at least in part on the received data and therefore based at least in part on the corresponding service latency. The service latency for one embodiment may be a service latency tolerance for the device. The service latency for one embodiment may be based at least in part on the maximum latency the device may tolerate without adversely affecting functionality or performance of the device. The service latency for one embodiment may correspond to a level relating to activity for at least a portion of the device. PCPMC 122 for one embodiment may therefore receive over time different service latencies from the device depending at least in part on the activity level for at least a portion of the device. PCPMC 122 for one embodiment may better identify the depth of lower power states which one or more components of system 100 may enter and still be responsive to the device with reduced concern for lost functionality and/or performance.

One or more PPMCs 112 for one embodiment may coordinate with PCPMC 122 and also manage power based at least in part on a service latency for a downstream device. PCPMC 122 for one embodiment may transmit received data corresponding to a service latency for a device to one or more PPMCs 112 for such PPMC(s) 112 to manage power based at least in part on that service latency. One or more PPMCs 112 for one embodiment may indirectly manage power based at least in part on a service latency for a device based at least in part on how PCPMC 122 manages power based at least in part on that service latency.

Platform control logic 120 for one embodiment may comprise one or more interface controllers 124 to communicate with one or more devices, such as devices 132 and 134. Such interface controller(s) 124 may comprise any suitable logic to interface with one or more devices in any suitable manner. One or more interface controllers 124 for one embodiment may be compatible with any suitable one or more standard specifications such as, for example and without limitation, any suitable Universal Serial Bus (USB) specification (e.g., USB Specification Revision 2.0, Apr. 27, 2000; USB 2.0 Link Power Management Addendum Engineering Change Notice, Jul. 16, 2007; USB 3.0 Specification Revision 1.0, Nov. 12, 2008) and/or any suitable Peripheral Component Interface (PCI) or PCI Express (PCIe) specification (e.g., PCI Express Base Specification Revision 1.0, Jul. 22, 2002; PCI Express Base Specification Revision 2.0, Jan. 15, 2007).

One or more interface controllers 124 for one embodiment may receive from one or more downstream devices data corresponding to a service latency for the device and transmit such data to PCPMC 122. One or more interface controllers 124 for one embodiment may include an interface controller power management controller (ICPMC) 126 to help improve power efficiency for the interface controller 124 and/or for the connection or link to one or more devices. One or more ICPMCs 126 for one embodiment may receive from one or more devices data corresponding to a service latency for the device and manage power based at least in part on the received data and therefore based at least in part on the corresponding service latency. PCPMC 122 for one embodiment may indirectly manage power based at least in part on a service latency for a device based at least in part on how one or more ICPMCs 126 manage power based at least in part on that service latency.

Interface controller(s) 124 for one embodiment may receive data corresponding to a service latency for a device, such as device 136 for example, downstream from another device, such as device 134 for example. Device 134 for one embodiment may receive from device 136 data corresponding to a service latency for device 136 and transmit such data to interface controller(s) 124. Device 134 for one embodiment may receive from device 136 data corresponding to a service latency for device 136 and manage power for device 134 based at least in part on the received data and therefore based at least in part on the corresponding service latency. A corresponding ICPMC 126 for one embodiment may indirectly manage power based at least in part on a service latency for device 136 based at least in part on how device 134 manages power based at least in part on that service latency.

For one embodiment, power may be managed in system 100 based at least in part on a service latency for a device as described in U.S. patent application Ser. No. 12/006,251, entitled LATENCY BASED PLATFORM COORDINATION, and filed Dec. 31, 2007; U.S. patent application Ser. No. 12/059,992, entitled PLATFORM POWER MANAGEMENT BASED ON LATENCY GUIDANCE, and filed Mar. 31, 2008; and/or U.S. patent application Ser. No. 12/146,873, entitled COORDINATED LINK POWER MANAGEMENT, and filed Jun. 26, 2008.

As illustrated in FIG. 1, system 100 for one embodiment may also have one or more input devices 140, one or more displays 150, volatile memory 160, one or more non-volatile memory and/or storage devices 170, and one or more communications interfaces 180.

Processor(s) 110 for one embodiment may include one or more memory controllers to provide an interface to volatile memory 160. Volatile memory 160 may be used to load and store data and/or instructions, for example, for system 100. Volatile memory 160 may include any suitable volatile memory, such as suitable dynamic random access memory (DRAM) for example. Processor(s) 110 for one embodiment may use PPMC(s) 112 to help manage power for volatile memory 160.

Although described as residing with processor(s) 110, one or more memory controllers for one embodiment may reside with platform control logic 120, allowing platform control logic 120 to communicate with volatile memory 160 directly.

Platform control logic 120 for one embodiment may include any suitable interface controllers, including interface controller(s) 124, to provide for any suitable communications link to processor(s) 110 and/or to any suitable device or component in communication with platform control logic 120. Platform control logic 120 for one embodiment may use PCPMC 122 to help manage power for any suitable one or more devices and/or components in communication with platform control logic 120.

Platform control logic 120 for one embodiment may include one or more graphics controllers to provide an interface to display(s) 150. Display(s) 150 may include any suitable display, such as a cathode ray tube (CRT) or a liquid crystal display (LCD) for example. One or more graphics controllers for one embodiment may alternatively be external to platform control logic 120.

Platform control logic 120 for one embodiment may include one or more input/output (I/O) controllers to provide an interface to input device(s) 140, non-volatile memory and/or storage device(s) 170, and communications interface(s) 180.

Input device(s) 140 may include any suitable input device(s), such as a keyboard, a mouse, and/or any other suitable cursor control device.

Non-volatile memory and/or storage device(s) 170 may be used to store data and/or instructions, for example. Non-volatile memory and/or storage device(s) 170 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example.

Communications interface(s) 180 may provide an interface for system 100 to communicate over one or more networks and/or with any other suitable device. Communications interface(s) 180 may include any suitable hardware and/or firmware. Communications interface(s) 180 for one embodiment may include, for example, a network adapter, a wireless network adapter, a telephone modem, and/or a wireless modem. For wireless communications, communications interface(s) 180 for one embodiment may use one or more antennas 182.

Downstream devices 132, 134, and 136 for one embodiment may be any suitable device that may be coupled to platform control logic 120 such as, for example and without limitation, a suitable input device 140, a suitable non-volatile memory or storage device 170, a suitable communications interface 180, or any other suitable I/O device. Examples of a downstream device may include, without limitation, a cursor control device, a storage drive, a storage device, a hub device, a network router or switch, a battery charging device, a printer, a scanner, a camcorder, a camera, a media player, a cellular telephone, a smart phone, a mobile internet device, and a computer system such as a desktop, notebook, netbook, or other computer system.

Although described as residing with platform control logic 120, one or more controllers of platform control logic 120, including one or more interface controllers 124, for one embodiment may reside with one or more processors 110, allowing a processor 110 to communicate with one or more devices or components directly. One or more controllers of platform control logic 120, including one or more interface controllers 124, for one embodiment may be integrated on a single die with at least a portion of one or more processors 110. One or more controllers of platform control logic 120, including one or more interface controllers 124, for one embodiment may be packaged with one or more processors 110.

Service Latency Reporting

Figure 2:
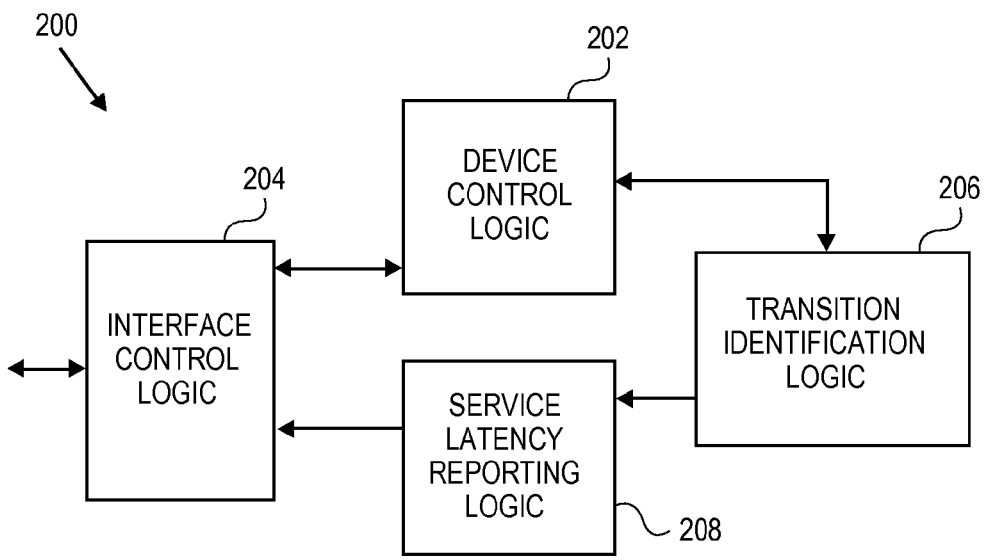
FIG. 2 illustrates, for one embodiment, a block diagram of a downstream device to report service latency to an upstream device.

FIG. 2 illustrates, for one embodiment, a device 200 that may report service latency for one or more upstream devices to manage power based at least in part on the service latency. Device 200 for one embodiment may correspond, for example, to downstream device 132 or 134 of FIG. 1 and report service latency for system 100 to manage power based at least in part on the service latency. Device 200 for one embodiment may correspond, for example, to downstream device 136 of FIG. 1 and report service latency for device 134 and/or system 100 to manage power based at least in part on the service latency.

As illustrated in FIG. 2, device 200 for one embodiment may comprise device control logic 202, interface control logic 204, transition identification logic 206, and service latency reporting logic 208. Device control logic 202, interface control logic 204, transition identification logic 206, and service latency reporting logic 208 may each be implemented in any suitable manner using, for example, any suitable hardware, any suitable hardware performing any suitable firmware, any suitable hardware performing any suitable software, or any suitable combination of such implementations. For one embodiment, any such firmware and/or software may be stored in any suitable computer readable storage medium or media of device 200. Device 200 for one embodiment may also comprise other suitable logic, circuitry, and/or one or more components to implement any suitable functionality for device 200.

Device control logic 202 for one embodiment may help control the functionality of device 200 and may communicate with one or more upstream devices using interface control logic 204 to provide functionality to one or more components of such device(s).

Interface control logic 204 may be coupled to device control logic 202 to transmit and/or receive data for device 200 in any suitable manner. Interface control logic 204 for one embodiment may be compatible with any suitable one or more standard specifications such as, for example and without limitation, any suitable Universal Serial Bus (USB) specification and/or any suitable Peripheral Component Interface (PCI) or PCI Express (PCIe) specification.

Transition identification logic 206 for one embodiment may identify a transition for at least a portion of device 200 from one state to another, different state in any suitable manner. Such states for one embodiment may correspond to different levels relating to activity for at least a portion of device 200. Transition identification logic 206 for one embodiment may identify a transition for at least a portion of device control logic 202 from one state to another, different state. Transition identification logic 206 for one embodiment may identify that at least a portion of device 200 is about to transition from one state to another, different state. Transition identification logic 206 for one embodiment may identify that at least a portion of device 200 has already transitioned from one state to another, different state.

Service latency reporting logic 208 for one embodiment may transmit to an upstream device data corresponding to a service latency in response to identification of a transition by transition identification logic 206. Service latency reporting logic 208 for one embodiment may be coupled to receive identification of a state transition from transition identification logic 206 in any suitable manner. Service latency reporting logic 208 for one embodiment may be coupled to transmit data corresponding to a service latency in any suitable manner using interface control logic 204.

Service latency reporting logic 208 for one embodiment may identify a service latency in any suitable manner. The service latency for one embodiment may be a service latency tolerance for device 200. The service latency for one embodiment may be based at least in part on the maximum latency device 200 may tolerate without adversely affecting functionality or performance of device 200. The service latency for one embodiment may correspond to a new state for at least a portion of device 200.

Service latency reporting logic 208 for one embodiment may identify a new service latency based at least in part on a prior or current service latency and identification of a state transition. Service latency reporting logic 208 for one embodiment may identify a new service latency based at least in part on a new state. Service latency reporting logic 208 for one embodiment may identify the new state based at least in part on a prior or current state. Service latency reporting logic 208 for one embodiment may receive identification of a new state from transition identification logic 206 in any suitable manner.

As at least a portion of device 200 may continue to transition between states, service latency reporting logic 208 for one embodiment may continue to identify new service latencies and transmit data corresponding to such service latencies. Service latency reporting logic 208 for one embodiment may optionally not transmit data corresponding to a new service latency, for example if the new service latency is the same as a prior or current service latency. Service latency reporting logic 208 for one embodiment may transmit data corresponding to a new service latency in response to one or more but not all transitions between states.

Figure 3:
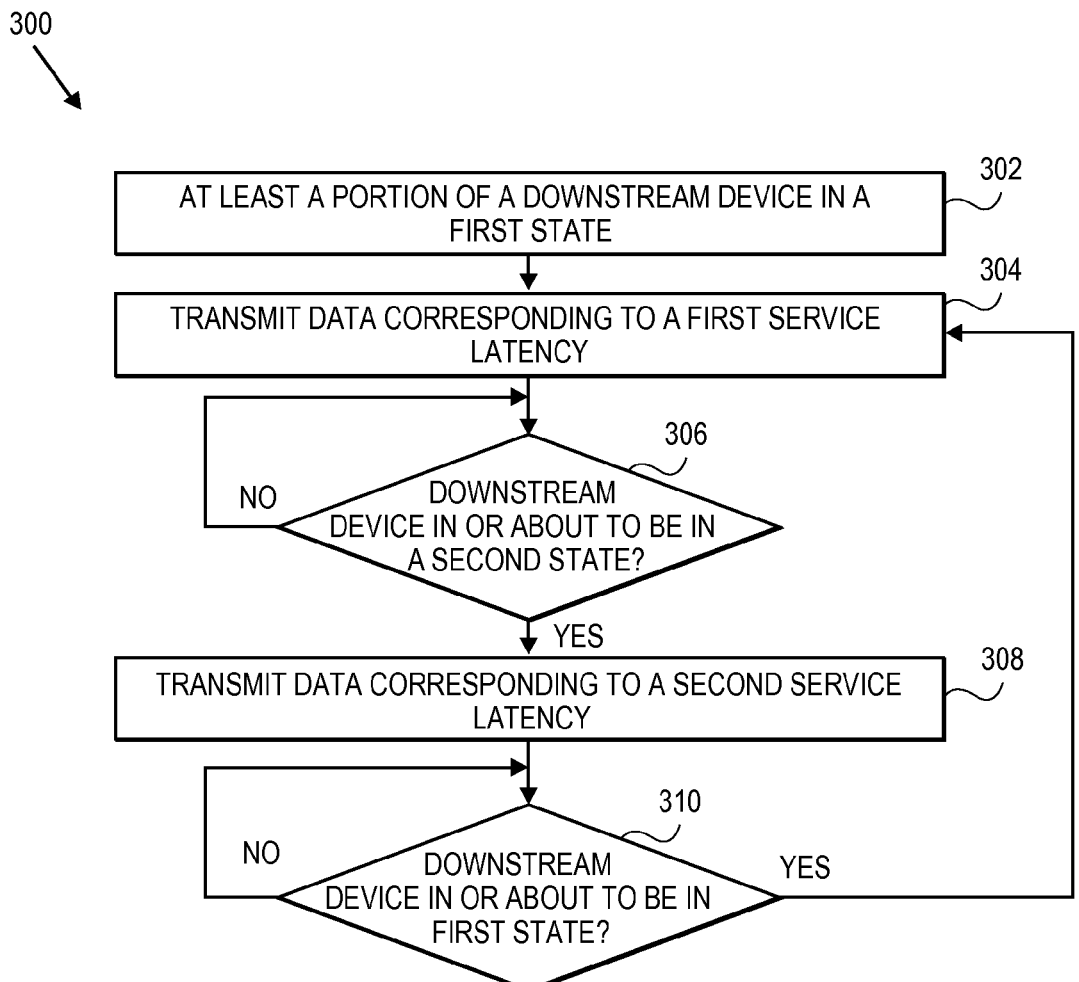
FIG. 3 illustrates, for one embodiment, an example flow diagram for a downstream device to report service latency to an upstream device.

FIG. 3 illustrates an example flow diagram 300 for one embodiment of device 200 to report service latency to an upstream device. As illustrated in FIG. 3, at least a portion of device 200 may be in a first state for block 302. Service latency reporting logic 208 for block 304 may transmit data corresponding to a first service latency that corresponds to the first state. Transition identification logic 206 may identify for block 306 whether at least a portion of device 200 has transitioned to or is about to transition to a second, different state. If so, service latency reporting logic 208 for block 308 may transmit data corresponding to a second service latency that corresponds to the second state. Transition identification logic 206 may identify for block 310 whether at least a portion of device 200 has transitioned to or is about to transition to the first state. If so, service latency reporting logic 208 for block 304 may transmit data corresponding to the first service latency. Service latency reporting logic 208 and transition identification logic 206 for one embodiment may continue to perform operations for blocks 304-310 in this manner.

Although described in connection with first and second service latencies corresponding to first and second states, service latency reporting logic 208 for one embodiment may transmit data for service latencies corresponding to more than two states.

Service Latency Based at Least in Part on Activity Level

Transition identification logic 206 for one embodiment may identify a transition for at least a portion of device 200 between states corresponding to different activity levels. Service latency reporting logic 208 for one embodiment may transmit data corresponding to a lower service latency for a transition to a state corresponding to a higher activity level and may transmit data corresponding to a higher service latency for a transition to a state corresponding to a lower activity level. Transition identification logic 206 for one embodiment may identify a transition for at least a portion of device 200 between an active state where device 200 has data communications with an upstream device and an idle state where device 200 does not have data communications with an upstream device.

At least a portion of device 200 for one embodiment may at some times frequently transition between different states. As one example, at least a portion of device 200 for one embodiment may have bursts of activity and therefore at some times frequently transition into and out from a low activity or idle state. Service latency reporting logic 208 for one embodiment may wait a predetermined period of time after identification of a state transition before transmitting data corresponding to a service latency to help identify whether at least a portion of device 200 is more likely to remain in a new state. In this manner, service latency reporting logic 208 for one embodiment may avoid frequently transmitting data corresponding to different service latencies that could otherwise reduce the effectiveness of power management for one or more upstream devices.

Service latency reporting logic 208 for one embodiment may wait a predetermined period of time after identification of a transition to a state corresponding to a service latency higher than a current service latency but not after identification of a transition to a state corresponding to a service latency lower than a current service latency. As one example, service latency reporting logic 208 for one embodiment may wait a predetermined period of time after identification of a transition to a low activity or idle state but not after identification of a transition to a higher activity state.

Figure 4:
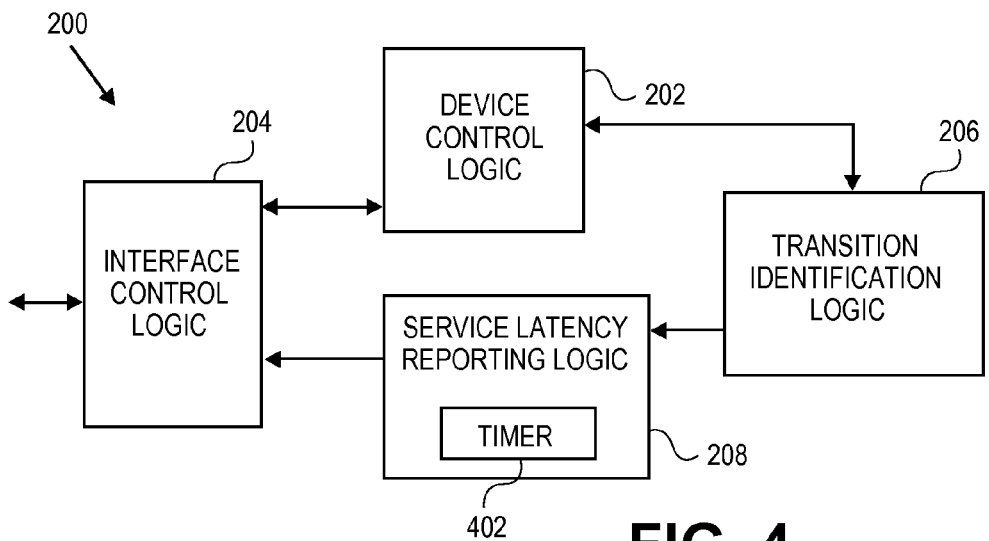
FIG. 4 illustrates, for one embodiment, a block diagram of a downstream device to report service latency to an upstream device in accordance with a first technique.

As illustrated in FIG. 4, service latency reporting logic 208 for one embodiment may have a timer 402 to identify a wait time after identification of a new state transition. Service latency reporting logic 208 for one embodiment may compare the wait time with a predetermined threshold and wait until the wait time equals or exceeds the predetermined threshold before transmitting data corresponding to a service latency for the new state transition. If transition identification logic 206 identifies a newer state transition before the predetermined threshold has been reached, service latency reporting logic 208 for one embodiment may restart timer 402 for the newer transition. Service latency reporting logic 208 for one embodiment may instead, depending for example at least in part on the state for the newer transition, reset timer 402 and transmit data corresponding to a service latency for the newer transition.

Figure 5:
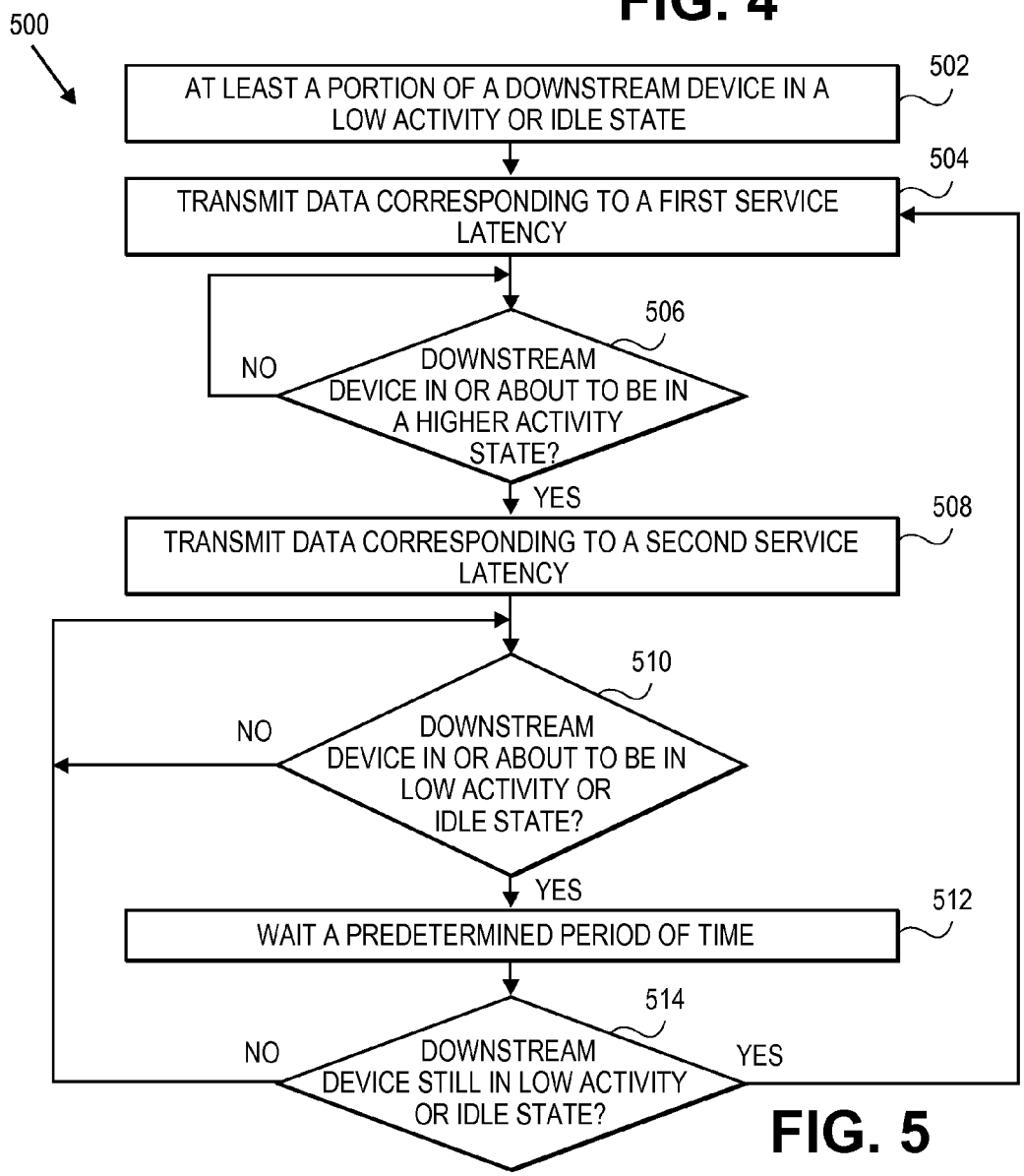
FIG. 5 illustrates, for one embodiment, an example flow diagram for a downstream device to report service latency to an upstream device in accordance with the first technique.

FIG. 5 illustrates an example flow diagram 500 for one embodiment of device 200 to report service latency to an upstream device. As illustrated in FIG. 5, at least a portion of device 200 may be in a low activity or idle state for block 502. Service latency reporting logic 208 for block 504 may transmit data corresponding to a first service latency. Transition identification logic 206 may identify for block 506 whether at least a portion of device 200 has transitioned to or is about to transition to a higher activity state. If so, service latency reporting logic 208 for block 508 may transmit data corresponding to a second service latency. Transition identification logic 206 may identify for block 510 whether at least a portion of device 200 has transitioned to or is about to transition to the low activity or idle state. If so, service latency reporting logic 208 for block 512 may wait a predetermined period of time. If at least a portion of device 200 is still in the low activity or idle state for block 514, service latency reporting logic 208 for block 504 may transmit data corresponding to the first service latency. Service latency reporting logic 208 and transition identification logic 206 for one embodiment may continue to perform operations for blocks 504-514 in this manner.

Although described in connection with idle and active service latencies corresponding to low activity/idle and active states, service latency reporting logic 208 for one embodiment may transmit data for service latencies corresponding to one or more additional states, such as one or more states corresponding to different levels of activity.

Service Latency Based at Least in Part on Device Buffering

Figure 6:
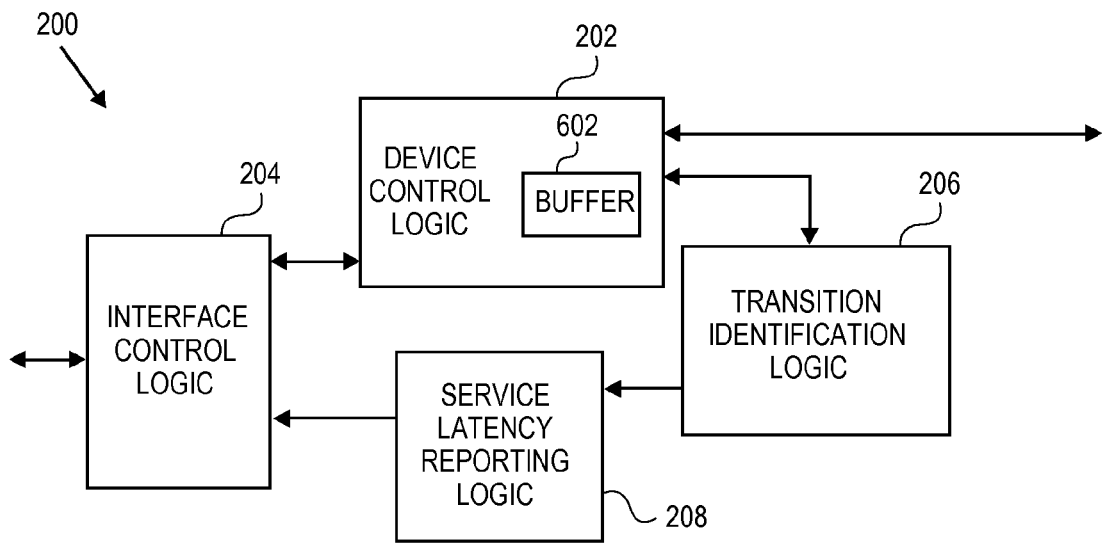
FIG. 6 illustrates, for one embodiment, a block diagram of a downstream device to report service latency to an upstream device in accordance with a second technique.

Device 200 for one embodiment may receive data from another device for transmission to an upstream device. As illustrated in FIG. 6, device control logic 202 for one embodiment may include a buffer 602 to receive data from another device over any suitable communications link, including any suitable wireless link, for subsequent transmission from buffer 602 to an upstream device using interface control logic 204. Device 200 for one embodiment may be, for example, an Ethernet Network Interface Controller (NIC).

For one embodiment when at least a portion of device 200 is in a low activity or idle state, device 200 may transmit data corresponding to a service latency based at least in part on an available capacity of buffer 602 for device 200 to receive data. In this manner, an upstream device for one embodiment can remain able to respond within the service latency period to start receiving data from buffer 602 before the available capacity of buffer 602 fills. If the service latency were otherwise higher, an upstream device might possibly enter a deeper, lower power state and not respond in time, allowing buffer 602 to overflow and incurring performance loss to have lost data retransmitted.

Transition identification logic 206 for one embodiment may identify a transition from the low activity or idle state to an active state to receive data in and retransmit data from buffer 602. Service latency reporting logic 208 for one embodiment may then transmit data corresponding to a lower service latency to the upstream device. Service latency reporting logic 208 for one embodiment may transmit data corresponding to a service latency based at least in part on a reserve capacity of buffer 602 for device 200 to receive data. In this manner, device 200 may continue to receive data in buffer 602 as data starts to be transmitted from buffer 602 to the upstream device.

Figure 7:
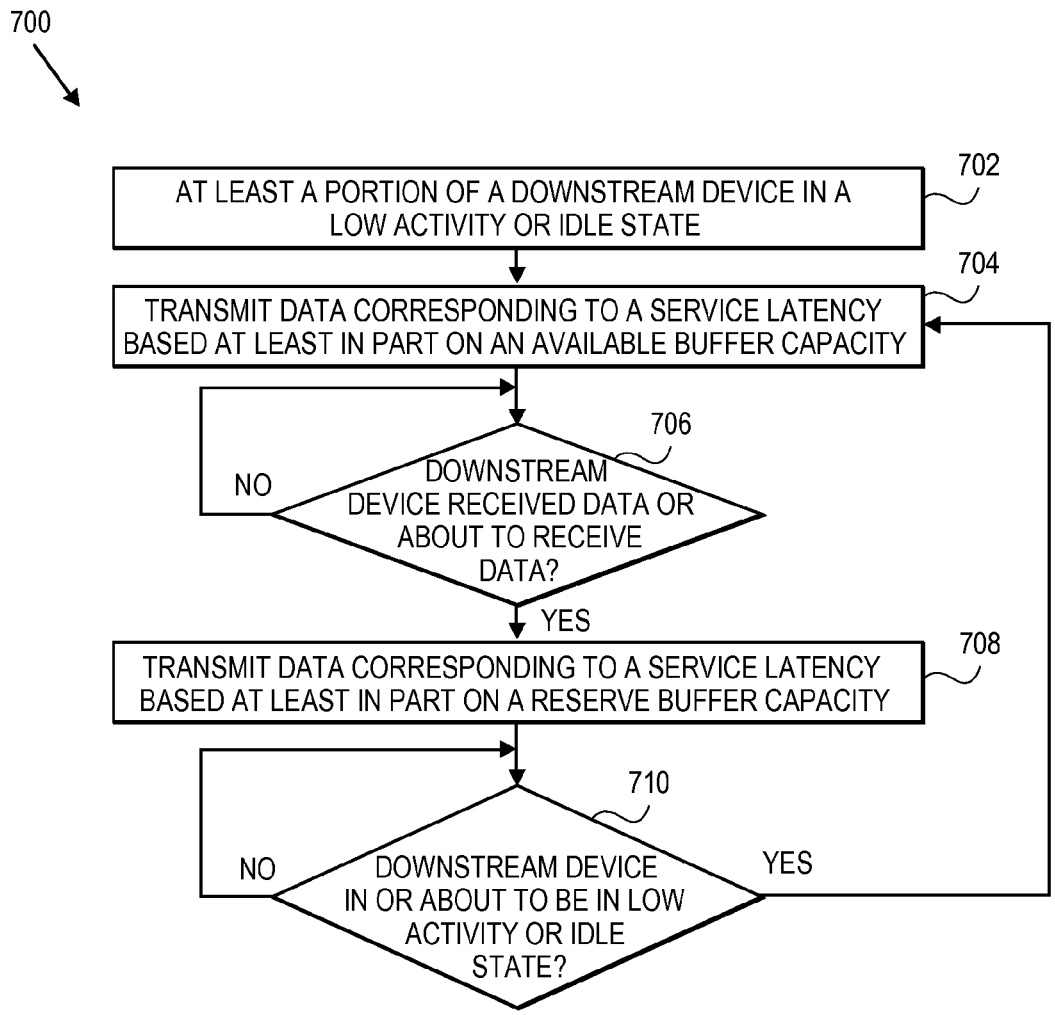
FIG. 7 illustrates, for one embodiment, an example flow diagram for a downstream device to report service latency to an upstream device in accordance with the second technique.

FIG. 7 illustrates an example flow diagram 700 for one embodiment of device 200 to report service latency to an upstream device. As illustrated in FIG. 7, at least a portion of device 200 may be in a low activity or idle state for block 702. Service latency reporting logic 208 for block 704 may transmit data corresponding to a service latency based at least in part on an available buffer capacity. Transition identification logic 206 may identify for block 706 whether at least a portion of device 200 has transitioned to or is about to transition to an active state to receive and retransmit data from another device. If so, service latency reporting logic 208 for block 708 may transmit data corresponding to a service latency based at least in part on a reserve buffer capacity. Transition identification logic 206 may identify for block 710 whether at least a portion of device 200 has transitioned to or is about to transition to the low activity or idle state. If so, service latency reporting logic 208 for block 704 may transmit data corresponding to the service latency based at least in part on an available buffer capacity. Service latency reporting logic 208 for one embodiment may optionally wait a predetermined period of time after identification of a state transition for block 710 before transmitting data for block 704. Service latency reporting logic 208 and transition identification logic 206 for one embodiment may continue to perform operations for blocks 704-710 in this manner.

Service latency reporting logic 208 for one embodiment may account for data rate and/or performance requirements for the upstream device in receiving data to identify a service latency for blocks 704 and 708.

Although described in connection with service latencies corresponding to low activity/idle and active states, service latency reporting logic 208 for one embodiment may transmit data for service latencies corresponding to one or more additional states. For one embodiment, service latency reporting logic 208 may transmit data for service latencies corresponding to states that correspond to different ranges of data rates at which device 200 may receive data from another device. For one embodiment, service latency reporting logic 208 may transmit data for service latencies corresponding to states that correspond to different performance requirements for the upstream device in receiving data.

Figure 8:
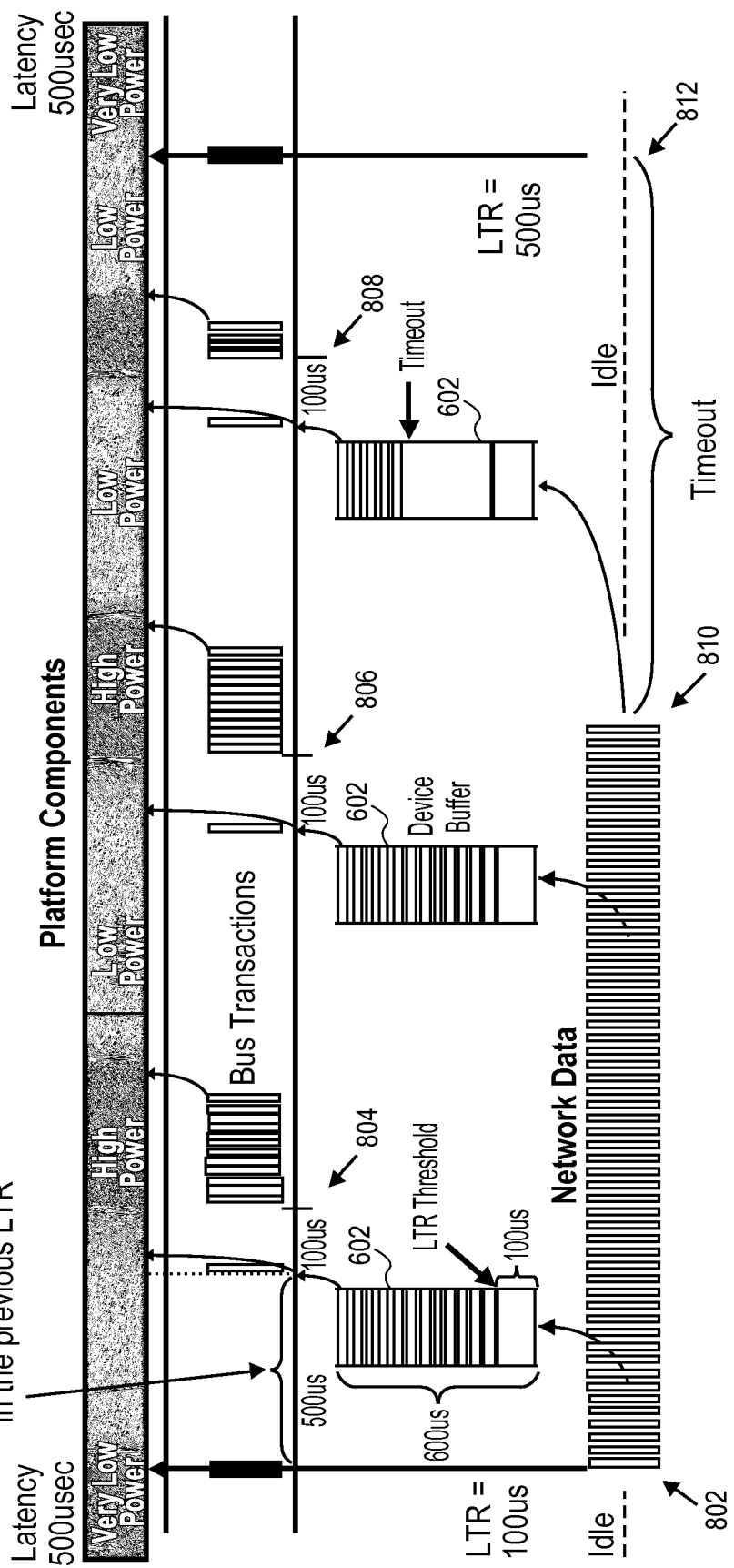
FIG. 8 illustrates, for one embodiment, an example diagram for a downstream device to report service latency to an upstream device in accordance with the second technique.

FIG. 8 illustrates an example diagram for one embodiment of device 200 to report service latency to an upstream device. As illustrated in FIG. 8, buffer 602 receives network data at 802. Prior to receiving network data, device 200 was in an idle state and transmitted to upstream platform components data corresponding to a latency tolerance report (LTR) of 500 microseconds (μs) which is based at least in part on an available capacity of buffer 602 and the rate at which network data is received into buffer 602. When device 200 initially receives network data, device 200 transitions to, or is about to transition to, an active state and transmits data corresponding to an LTR of 100 μs at 802 to upstream platform components. The 100 μs LTR is based at least in part on a reserve capacity of buffer 602 and the rate at which network data is received into buffer 602. The 100 μs LTR takes effect within the prior 500 μs LTR period while buffer 602 receives network data.

Upstream platform components respond within the 100 μs LTR at 804, 806, and 808 to receive data from buffer 602. When device 200 no longer receives network data at 810, device 200 transitions to an idle state, waits a predetermined amount of time illustrated as Timeout, and transmits data corresponding to the 500 μs LTR at 812 to upstream platform components. As illustrated in FIG. 8, upstream platform components enter various power states based at least in part on the LTRs and responses to receive data from buffer 602.

Service Latency Based at Least in Part on Power State

Transition identification logic 206 for one embodiment may identify a transition for at least a portion of device 200 between states corresponding to different power levels. Service latency reporting logic 208 for one embodiment may transmit data corresponding to a lower service latency for a transition to a higher power state and may transmit data corresponding to a higher service latency for a transition to a lower power state.

Figure 9:
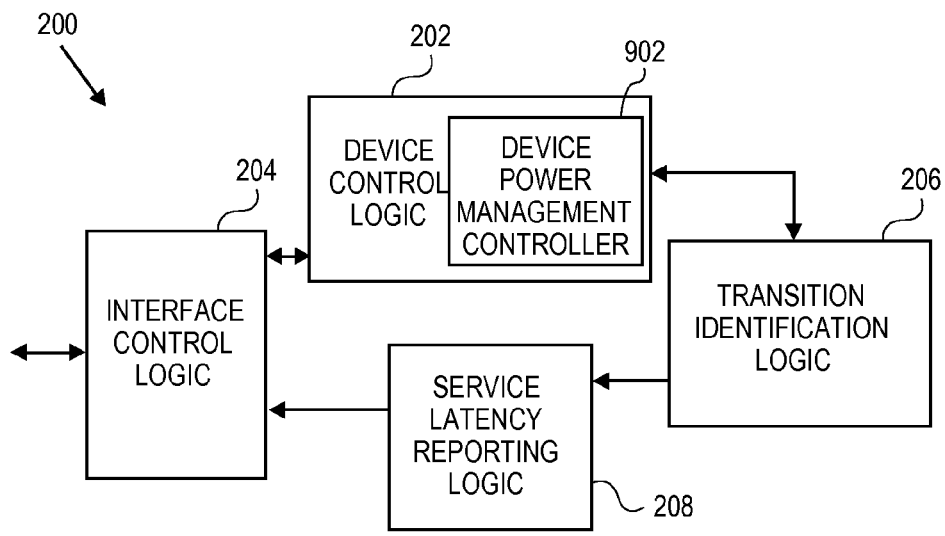
FIG. 9 illustrates, for one embodiment, a block diagram of a downstream device to report service latency to an upstream device in accordance with a third technique.

As illustrated in FIG. 9, device control logic 202 for one embodiment may include a device power management controller (DPMC) 902 to help improve power efficiency for device 200. DPMC 902 for one embodiment may, for example, manage at least a portion of device 200 to enter into one or more lower power or sleep states when less active or idle.

Figure 10:
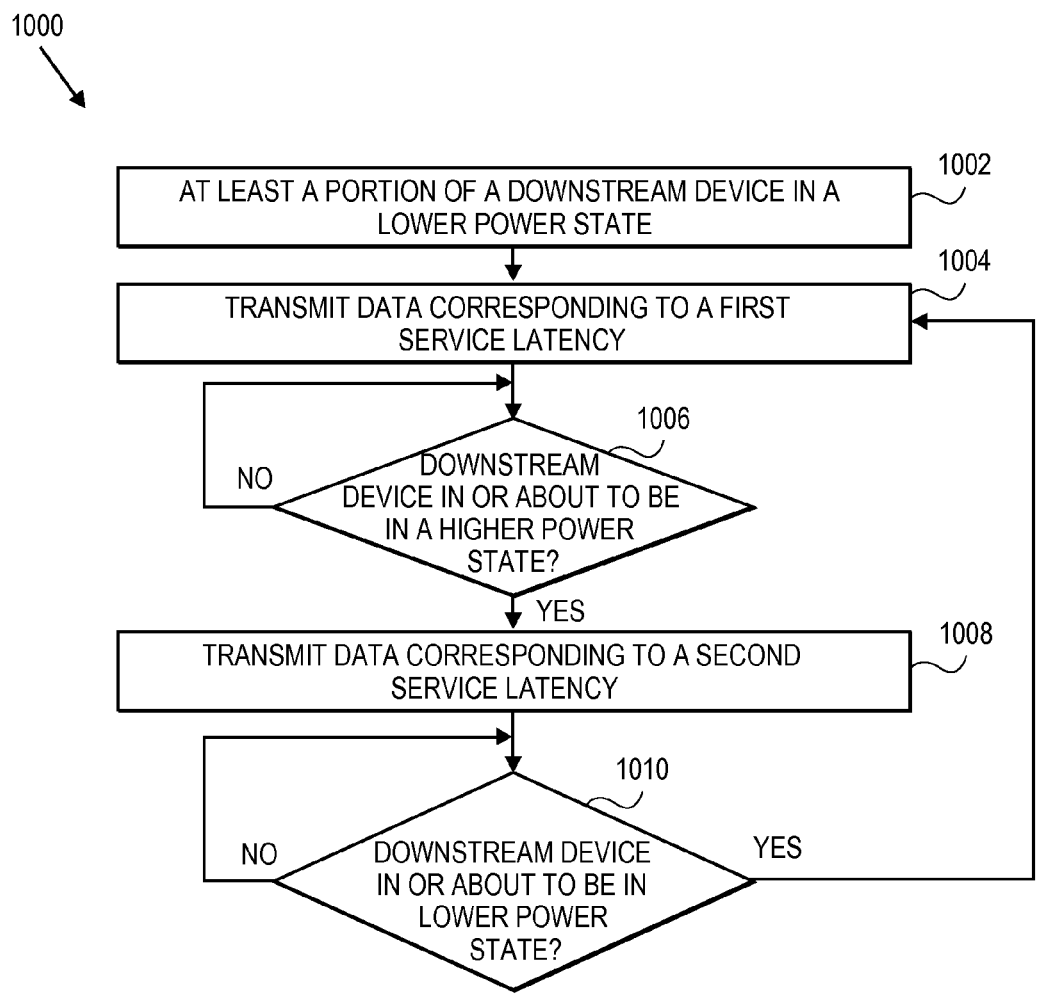
FIG. 10 illustrates, for one embodiment, an example flow diagram for a downstream device to report service latency to an upstream device in accordance with the third technique.

FIG. 10 illustrates an example flow diagram 1000 for one embodiment of device 200 to report service latency to an upstream device. As illustrated in FIG. 10, at least a portion of device 200 may be in a lower power state for block 1002. Service latency reporting logic 208 for block 1004 may transmit data corresponding to a first service latency that corresponds to the lower power state. Transition identification logic 206 may identify for block 1006 whether at least a portion of device 200 has transitioned to or is about to transition to a higher power state. If so, service latency reporting logic 208 for block 1008 may transmit data corresponding to a second service latency that corresponds to the higher power state. Transition identification logic 206 may identify for block 1010 whether at least a portion of device 200 has transitioned to or is about to transition to the lower power state. If so, service latency reporting logic 208 for block 1004 may transmit data corresponding to the first service latency. Service latency reporting logic 208 and transition identification logic 206 for one embodiment may continue to perform operations for blocks 1004-1010 in this manner.

Although described in connection with first and second service latencies corresponding to lower and higher power states, service latency reporting logic 208 for one embodiment may transmit data for service latencies corresponding to more than two power states.

Figure 11:
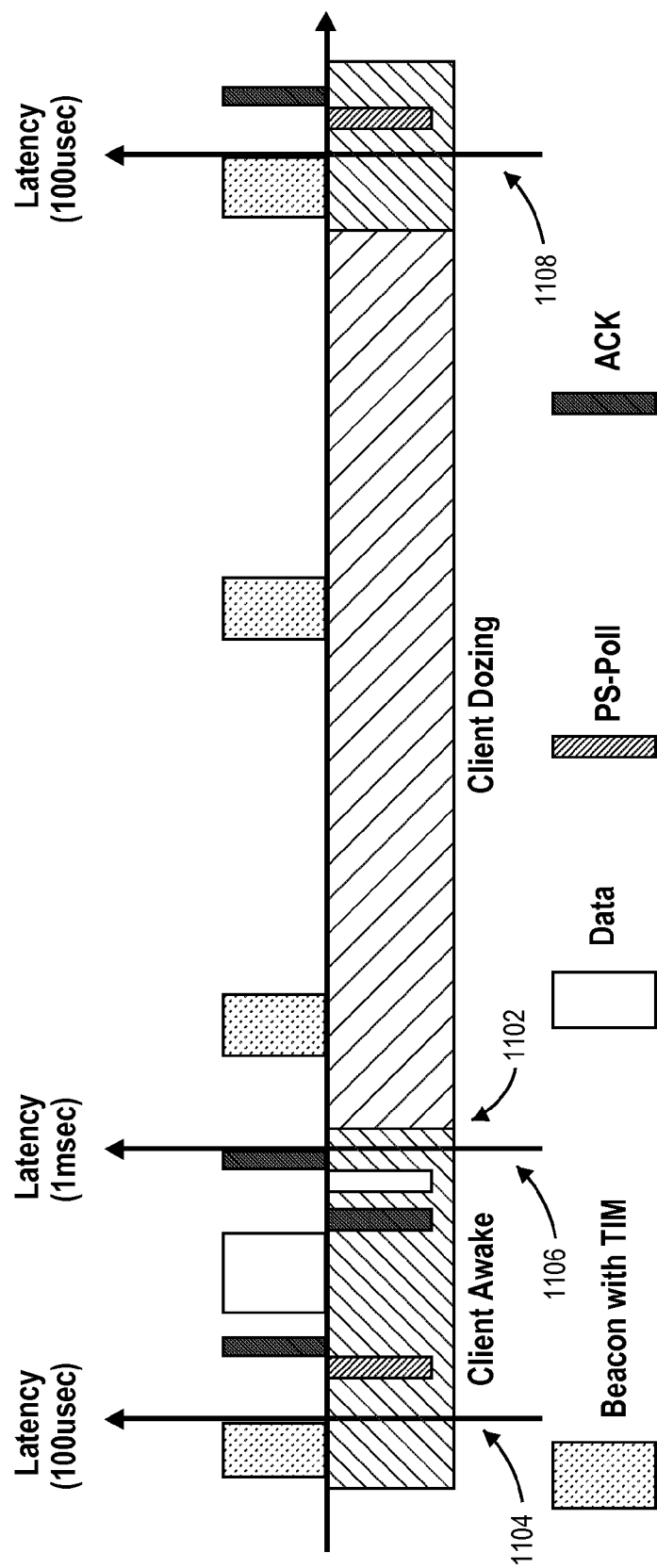
FIG. 11 illustrates, for one embodiment, an example diagram for a downstream device to report service latency to an upstream device in accordance with the third technique.

FIG. 11 illustrates an example diagram for one embodiment of device 200 to report service latency to an upstream device. Device 200 for FIG. 11 may be, for example, a wireless local area network (WLAN) device. As illustrated in FIG. 11, DPMC 902 may power manage a radio of device 200 and enter into a lower power or sleep state at 1102. Device 200 for FIG. 11 for one embodiment may use a wireless protocol that supports power management features to allow device 200 to indicate to an access point or base station, for example, that device 200 is entering a lower power state. No data would then be transmitted to device 200 when in the lower power state.

Prior to entering the lower power state, device 200 was in a higher power state and transmitted to an upstream device data corresponding to a latency of 100 microseconds (μs) at 1104. When device 200 is to transition to a lower power state, device 200 transmits to the upstream device data corresponding to a latency of 1 millisecond (ms) at 1106. When device 200 is ready to move data and is to transition to a higher power state, device 200 transmits to the upstream device data corresponding to a latency of 100 μs at 1108.

Service Latency Based at Least in Part on Task Performance

Transition identification logic 206 for one embodiment may identify a transition for at least a portion of device 200 between states corresponding to different task performance levels. Service latency reporting logic 208 for one embodiment may transmit data corresponding to a lower service latency for a transition to a higher task performance state and may transmit data corresponding to a higher service latency for a transition to a lower task performance state. A higher task performance state for one embodiment may correspond, for example, to a state with one or more pending tasks. A lower task performance state for one embodiment may correspond, for example, to a state with no pending tasks or completion of one or more tasks.

Device control logic 202 for one embodiment may perform one or more tasks for device 200. Device control logic 202 for one embodiment may initiate performance of one or more tasks on its own. Device control logic 202 for one embodiment may perform one or more tasks at the request of another device. Device control logic 202 for one embodiment may perform one or more tasks at the request of an upstream device.

Figure 12:
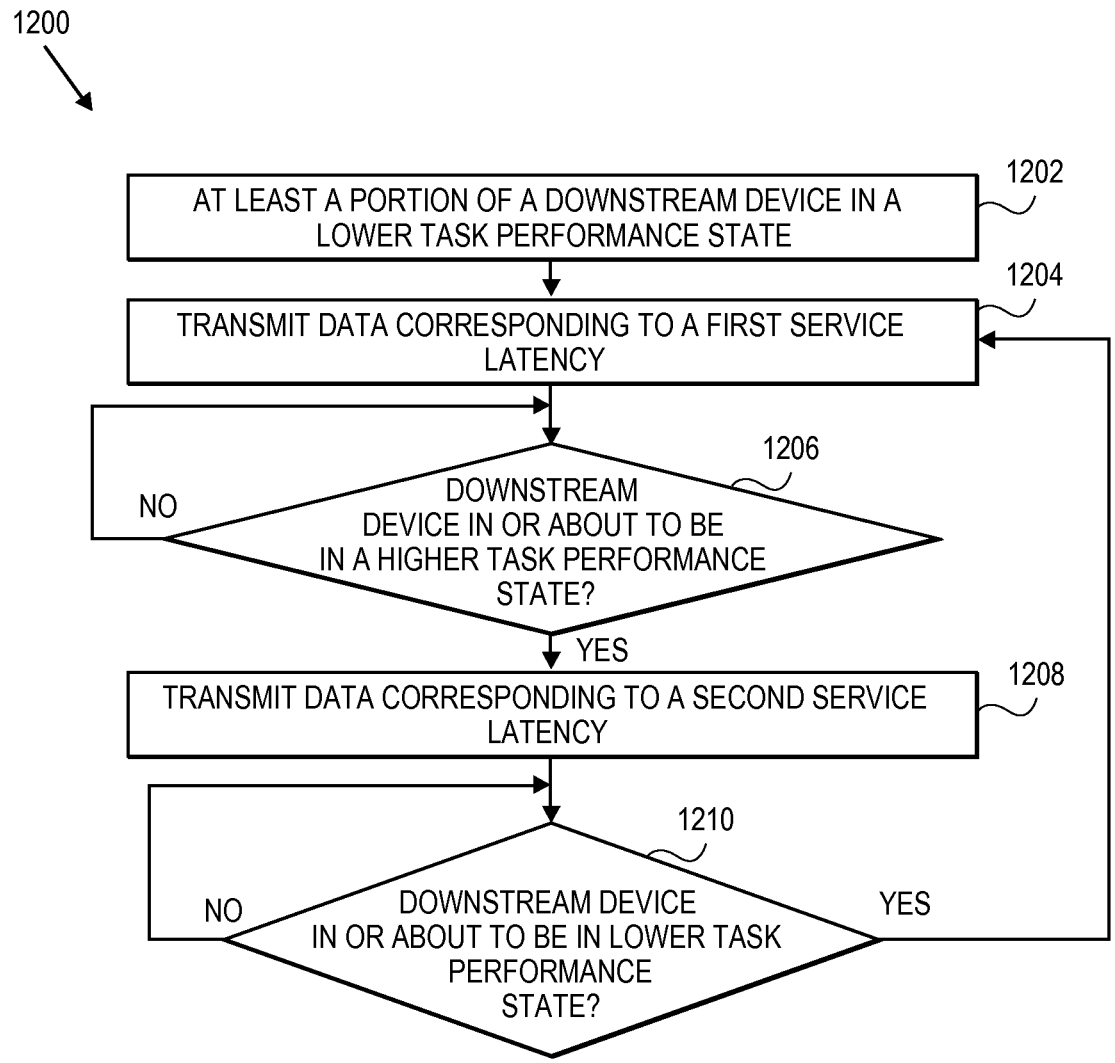
FIG. 12 illustrates, for one embodiment, an example flow diagram for a downstream device to report service latency to an upstream device in accordance with a fourth technique.

FIG. 12 illustrates an example flow diagram 1200 for one embodiment of device 200 to report service latency to an upstream device. As illustrated in FIG. 12, at least a portion of device 200 may be in a lower task performance state for block 1202. Service latency reporting logic 208 for block 1204 may transmit data corresponding to a first service latency that corresponds to the lower task performance state. Transition identification logic 206 may identify for block 1206 whether at least a portion of device 200 has transitioned to or is about to transition to a higher task performance state. If so, service latency reporting logic 208 for block 1208 may transmit data corresponding to a second service latency that corresponds to the higher task performance state. Transition identification logic 206 may identify for block 1210 whether at least a portion of device 200 has transitioned to or is about to transition to the lower task performance state. If so, service latency reporting logic 208 for block 1204 may transmit data corresponding to the first service latency. Service latency reporting logic 208 and transition identification logic 206 for one embodiment may continue to perform operations for blocks 1204-1210 in this manner.

Although described in connection with first and second service latencies corresponding to lower and higher task performance states, service latency reporting logic 208 for one embodiment may transmit data for service latencies corresponding to more than two states corresponding to different task performance levels.

Externally Controlled Service Latency

Service latency reporting logic 208 for one embodiment may transmit to an upstream device data corresponding to a service latency identified by the upstream device. Device 200 for one embodiment may have a service latency that may be identified by an upstream device, for example, if device 200 does not have a stringent service latency or has service latencies that vary infrequently. Device 200 for one embodiment may have a service latency that may be identified by an upstream device, for example, if device 200 is to perform one or more tasks scheduled by an upstream device. The upstream device for one embodiment may identify a lower service latency for device 200 before tasks are scheduled and a higher service latency for device 200 when all scheduled tasks are completed.

The upstream device for one embodiment may transmit to device 200 data corresponding to a service latency identified by the upstream device. The upstream device for one embodiment may perform software to identify a service latency for device 200. Such software for one embodiment may be, for example, driver software for device 200.

Figure 13:
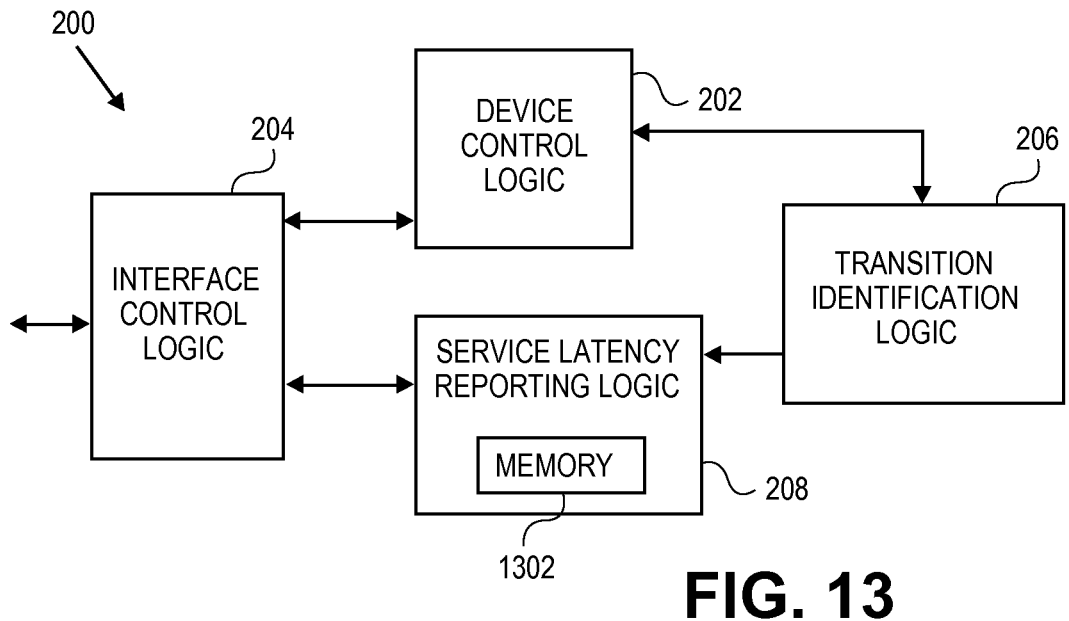
FIG. 13 illustrates, for one embodiment, a block diagram of a downstream device to report service latency to an upstream device in accordance with a fifth technique.

As illustrated in FIG. 13, service latency reporting logic 208 for one embodiment may include memory 1302 to receive data corresponding to a service latency from an upstream device. For one embodiment, at least a portion of memory 1302 may be mapped into memory space of an upstream device. Memory 1302 for one embodiment may include one or more registers. Memory 1302 for one embodiment may be a memory mapped input/output (MMIO) register.

Figure 14:
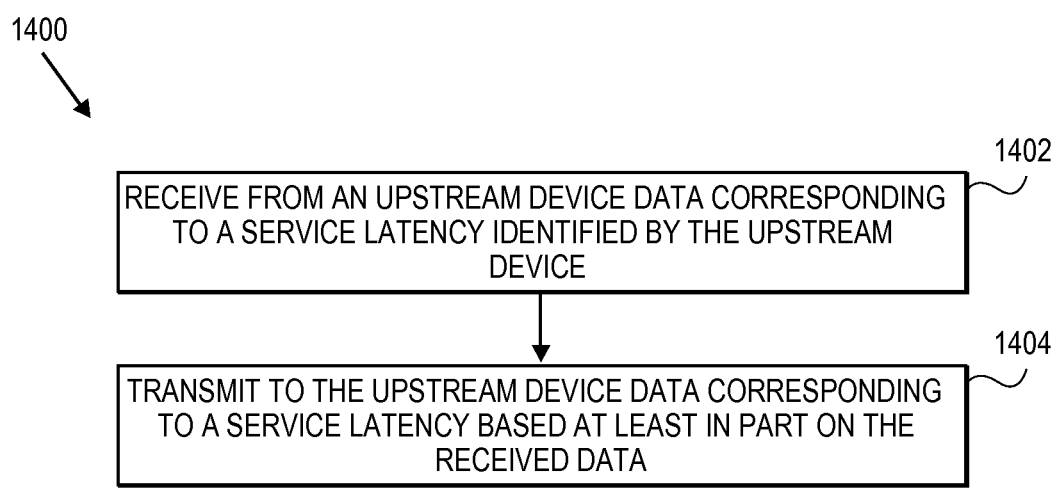
FIG. 14 illustrates, for one embodiment, an example flow diagram for a downstream device to report service latency to an upstream device in accordance with the fifth technique.

FIG. 14 illustrates an example flow diagram 1400 for one embodiment of device 200 to report service latency to an upstream device. As illustrated in FIG. 14, service latency reporting logic 208 for block 1402 may receive from an upstream device data corresponding to a service latency identified by the upstream device. The upstream device for one embodiment may transmit such data in performing software. Service latency reporting logic 208 for block 1404 may transmit to the upstream device data corresponding to a service latency based at least in part on the data received for block 1402. Service latency reporting logic 208 for one embodiment may transmit data for block 1404 to a power management controller of the upstream device.

Service Latency Based at Least in Part on Periodic Transitions

At least a portion of device 200 for one embodiment may transition from a first state to a second, different state at substantially fixed time intervals. At least a portion of device 200 for one embodiment may transition from a low activity or idle state to a higher activity state at substantially fixed time intervals, returning to the low activity or idle state prior to expiration of the next time interval. As one example, device 200 may communicate with an upstream device at substantially fixed time intervals.

Figure 15:
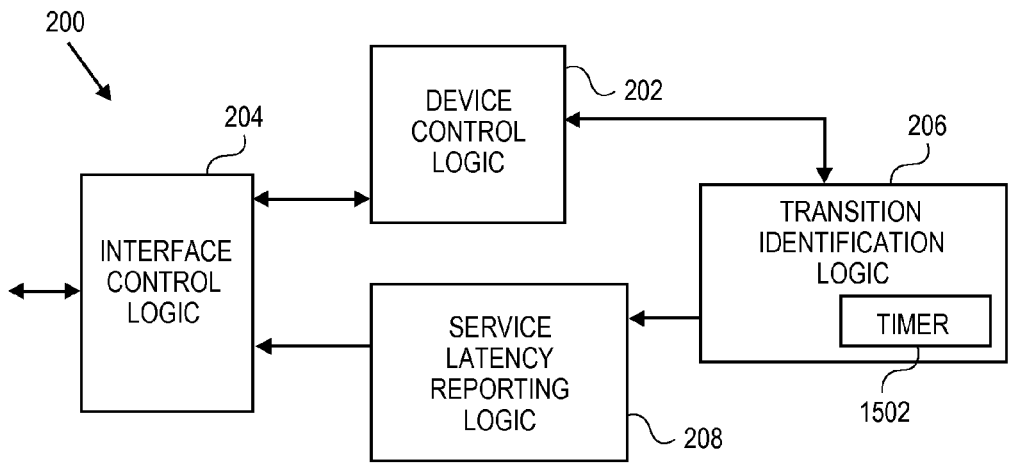
FIG. 15 illustrates, for one embodiment, a block diagram of a downstream device to report service latency to an upstream device in accordance with a sixth technique.

As illustrated in FIG. 15, transition identification logic 206 for one embodiment may have a timer 1502 to identify the expiration of a fixed time interval after identification of a transition for at least a portion of device 200 from a first state to a second, different state to identify another transition for at least a portion of device 200 from the first state to the second state. For another embodiment, device control logic 202 may have a timer to control transition of at least a portion of device 200 from the first state to the second state, and transition identification logic 206 for one embodiment may identify such a transition for at least a portion of device 200 in any suitable manner.

Figure 16:
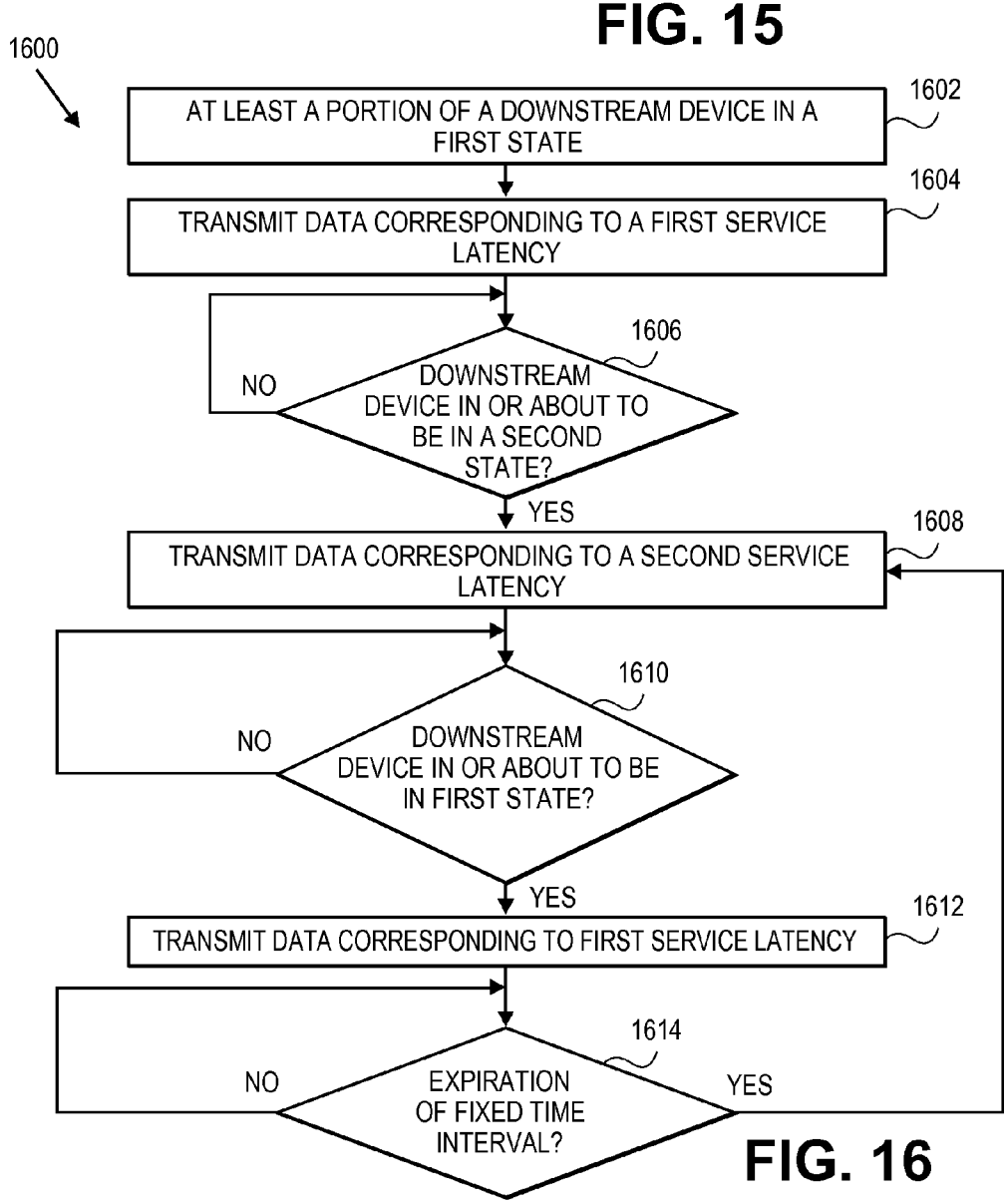
FIG. 16 illustrates, for one embodiment, an example flow diagram for a downstream device to report service latency to an upstream device in accordance with the sixth technique.

FIG. 16 illustrates an example flow diagram 1600 for one embodiment of device 200 to report service latency to an upstream device. As illustrated in FIG. 16, at least a portion of device 200 may be in a first state for block 1602. Service latency reporting logic 208 for block 1604 may transmit data corresponding to a first service latency that corresponds to the first state. Transition identification logic 206 may identify for block 1606 whether at least a portion of device 200 has transitioned to or is about to transition to a second state. If so, service latency reporting logic 208 for block 1608 may transmit data corresponding to a second service latency that corresponds to the second state. Transition identification logic 206 may identify for block 1610 whether at least a portion of device 200 has transitioned to or is about to transition to the first state. If so, service latency reporting logic 208 for block 1612 may transmit data corresponding to the first service latency. Transition identification logic 206 may identify for block 1614 whether at least a portion of device 200 has transitioned to or is about to transition to the second state. For one embodiment, such identification may be made based at least in part on expiration of a fixed time interval after a prior identification of a transition from the first state to the second state. If so for block 1614, service latency reporting logic 208 for block 1608 may transmit data corresponding to the second service latency. Service latency reporting logic 208 and transition identification logic 206 for one embodiment may continue to perform operations for blocks 1608-1614 in this manner.

FIG. 17 illustrates an example diagram for one embodiment of device 200 to report service latency to an upstream device. Device 200 for FIG. 17 may transition from an idle state to a higher activity state at substantially fixed time intervals, returning to the idle state prior to expiration of the next time interval. Device 200 for FIG. 17 may be, for example, a voice over internet protocol (VOIP) device.

As illustrated in FIG. 17, device 200 at 1702 may transition from a higher activity state, represented by a transfer of data between device 200 and an upstream device, to an idle state and transmit to the upstream device data corresponding to a 1 millisecond (ms) service latency. Device 200 at 1704 may transmit to the upstream device data corresponding to a 20 microsecond (μs) service latency when device 200 is about to again enter the higher activity state. As device 200 is to enter the higher activity state at substantially 20 ms time intervals, device 200 may transmit to the upstream device data corresponding to a 20 microsecond (μs) service latency at substantially 20 ms time intervals.

In the foregoing description, example embodiments have been described. Various modifications and changes may be made to such embodiments without departing from the scope of the appended claims. The description and drawings are, accordingly, to be regarded in an illustrative rather than a restrictive sense.

What is claimed is:

1. An apparatus comprising:
 first logic to identify a transition for at least a portion of a downstream device from a first state to a second, different state, wherein the first and second states correspond to different levels relating to activity for at least a portion of the downstream device; and
 second logic to transmit to an upstream device data corresponding to a service latency in response to the identified transition for one or more upstream devices to manage power based at least in part on the service latency,
 wherein the second logic is to wait a predetermined period of time after identification of the transition before transmitting the data.

2. The apparatus of claim 1, wherein the second state is an idle state.

3. The apparatus of claim 1, wherein the second state is an idle state and the service latency is based at least in part on an available capacity of a buffer for the downstream device to receive data.

4. The apparatus of claim 1, wherein the second state is an active state and the service latency is based at least in part on a reserve capacity of a buffer for the downstream device to receive data.

5. The apparatus of claim 1, wherein the second state is a lower power state relative to the first state.

6. The apparatus of claim 1, wherein the first state corresponds to the performance of one or more tasks by the downstream device and the second state corresponds to completion of one or more tasks by the downstream device.

7. The apparatus of claim 1, wherein the second logic is to transmit to an upstream device data corresponding to a service latency identified by the upstream device.

8. The apparatus of claim 1, wherein at least a portion of the downstream device is to transition from the first state to the second state at substantially fixed time intervals.

9. The apparatus of claim 1, wherein the first logic is to identify that at least a portion of the downstream device is about to transition from the first state to the second state.

10. The apparatus of claim 1, wherein the first logic is to identify that at least a portion of the downstream device has transitioned from the first state to the second state.

11. A method comprising:
 identifying a transition for at least a portion of a downstream device from a first state to a second, different state, wherein the first and second states correspond to different levels relating to activity for at least a portion of the downstream device;
 transmitting to an upstream device data corresponding to a service latency in response to the identified transition for one or more upstream devices to manage power based at least in part on the service latency; and
 waiting a predetermined period of time after identification of the transition before transmitting the data.

12. The method of claim 11, wherein the second state is an idle state and the service latency is based at least in part on an available capacity of a buffer for the downstream device to receive data.

13. The method of claim 11, wherein the second state is a lower power state relative to the first state.

14. The method of claim 11, wherein the first state corresponds to the performance of one or more tasks by the downstream device and the second state corresponds to completion of one or more tasks by the downstream device.

15. The method of claim 11, wherein the transmitting includes transmitting to an upstream device data corresponding to a service latency identified by the upstream device.

16. The method of claim 11, comprising transitioning by at least a portion of the downstream device from the first state to the second state at substantially fixed time intervals.

17. The method of claim 11, wherein the second state is an idle state.

18. A downstream device comprising:
 first logic to identify a transition for at least a portion of the downstream device from a first state to a second, different state, wherein the first and second states correspond to different levels relating to activity for at least a portion of the downstream device;
 second logic to transmit to an upstream device data corresponding to a service latency in response to the identified transition for one or more upstream devices to manage power based at least in part on the service latency; and
 third logic to help control functionality of the downstream device,
 wherein the second logic is to wait a predetermined period of time after identification of the transition before transmitting the data.

19. The downstream device of claim 18, wherein the second state is an idle state and the service latency is based at least in part on an available capacity of a buffer for the downstream device to receive data.

20. The downstream device of claim 18, wherein the second state is a lower power state relative to the first state.

21. The downstream device of claim 18, wherein the first state corresponds to the performance of one or more tasks by the downstream device and the second state corresponds to completion of one or more tasks by the downstream device.

22. The downstream device of claim 18, wherein the second logic is to transmit to an upstream device data corresponding to a service latency identified by the upstream device.

23. The downstream device of claim 18, wherein at least a portion of the downstream device is to transition from the first state to the second state at substantially fixed time intervals.

24. The downstream device of claim 18, wherein the second state is an idle state.

* * * * *